United States Patent
Hotta (10) Patent No.: US 10,473,047 B2
(45) Date of Patent: Nov. 12, 2019

(54) APPARATUS AND METHOD FOR CONTROLLING AN INTERNAL COMBUSTION ENGINE

(71) Applicant: TOYOTA JIDOSHA KABUSHIKI KAISHA, Toyota-shi, Aichi-ken (JP)

(72) Inventor: Shintaro Hotta, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 7 days.

(21) Appl. No.: 15/531,060

(22) PCT Filed: Nov. 27, 2015

(86) PCT No.: PCT/IB2015/002231
§ 371 (c)(1),
(2) Date: May 26, 2017

(87) PCT Pub. No.: WO2016/083888
PCT Pub. Date: Jun. 2, 2016

(65) Prior Publication Data
US 2017/0328267 A1    Nov. 16, 2017

(30) Foreign Application Priority Data
Nov. 28, 2014  (JP) ................. 2014-242035

(51) Int. Cl.
*F02D 41/02* (2006.01)
*F02B 37/16* (2006.01)
(Continued)

(52) U.S. Cl.
CPC ...... *F02D 41/0275* (2013.01); *F02B 27/0294* (2013.01); *F02B 29/04* (2013.01);
(Continued)

(58) Field of Classification Search
CPC ............ F02D 41/0055; F02D 41/0275; F02D 13/0261
See application file for complete search history.

(56) References Cited

U.S. PATENT DOCUMENTS 5,848,529 A * 12/1998 Katoh .................. F01L 1/34
60/274
6,314,725 B1 * 11/2001 Wakui .................. F01L 1/34
60/285
(Continued)

FOREIGN PATENT DOCUMENTS

| CN | 101171411 A | 4/2008 |
|---|---|---|
| DE | 100 23 420 A1 | 11/2000 |

(Continued)

*Primary Examiner* — Sizo B Vilakazi
*Assistant Examiner* — Kevin R Steckbauer
(74) *Attorney, Agent, or Firm* — Finnegan, Henderson, Farabow, Garrett & Dunner, LLP (57) ABSTRACT

An engine includes an exhaust gas control apparatus that is configured to store NOx and react NOx with a reduction agent. A control device for the engine includes an electronic control unit. The electronic control unit is configured to: (i) execute a rich spike control, the rich spike control is a control executed to temporarily change an in-cylinder air-fuel ratio from a leaner air-fuel ratio than the stoichiometric air-fuel ratio to the stoichiometric air-fuel ratio or a richer air-fuel ratio than the stoichiometric air-fuel ratio, and (ii) vary an overlap amount of an intake valve and an exhaust valve such that the overlap amount is less during execution of the rich spike control than during non-execution of the rich spike control, in an operation range where a pressure of the intake port becomes higher than a pressure of the exhaust port.

7 Claims, 5 Drawing Sheets

(51) Int. Cl.
  *F02D 41/40*   (2006.01)
  *F02D 13/02*   (2006.01)
  *F02D 41/00*   (2006.01)
  *F02B 27/02*   (2006.01)
  *F02B 29/04*   (2006.01)
  *F02B 37/00*   (2006.01)
  *F02B 37/013*  (2006.01)
  *F02D 41/22*   (2006.01)
  *F02B 27/00*   (2006.01)

(52) U.S. Cl.
  CPC .......... *F02B 37/004* (2013.01); *F02B 37/013* (2013.01); *F02B 37/162* (2019.05); *F02D 13/0203* (2013.01); *F02D 13/0261* (2013.01); *F02D 41/0007* (2013.01); *F02D 41/221* (2013.01); *F02D 41/40* (2013.01); *F02B 27/00* (2013.01); *F02D 41/00* (2013.01); *F02D 2041/001* (2013.01); *F02D 2200/0406* (2013.01); *F02D 2200/0614* (2013.01); *F02D 2200/101* (2013.01); *Y02T 10/144* (2013.01); *Y02T 10/146* (2013.01); *Y02T 10/18* (2013.01); *Y02T 10/44* (2013.01)

(56) References Cited

U.S. PATENT DOCUMENTS

| | | | | |
|---|---|---|---|---|
| 6,519,933 | B2 * | 2/2003 | Ogiso | F01L 9/04 123/90.15 |
| 6,722,121 | B2 * | 4/2004 | Gui | F02D 13/0234 123/90.15 |
| 6,968,825 | B2 * | 11/2005 | Hitomi | F01L 1/053 123/406.11 |
| 7,584,605 | B2 * | 9/2009 | Beckmann | B01D 53/9495 60/274 |
| 8,001,767 | B2 * | 8/2011 | Kakuya | F02D 13/0246 60/276 |
| 8,359,839 | B2 * | 1/2013 | Van Nieuwstadt | F02D 13/0261 60/274 |
| 8,359,840 | B2 * | 1/2013 | Van Nieuwstadt | F01N 3/0231 60/274 |
| 8,387,370 | B2 * | 3/2013 | Van Nieuwstadt | F02D 41/0055 60/278 |
| 8,464,514 | B2 * | 6/2013 | Kerns | F02D 41/0007 60/274 |
| 9,422,851 | B2 * | 8/2016 | Nogawa | F02D 41/0275 |
| 9,599,036 | B2 * | 3/2017 | Ulrey | F02D 41/0007 |
| RE46,512 | E * | 8/2017 | Beckmann | B01D 53/9495 |
| 10,208,659 | B2 * | 2/2019 | Rollinger | F02D 41/0065 |
| 2001/0025486 | A1 * | 10/2001 | Ogiso | F01L 9/04 60/285 |
| 2004/0011025 | A1 * | 1/2004 | Gui | F02D 13/0234 60/285 |
| 2005/0016496 | A1 * | 1/2005 | Hitomi | F01L 1/053 123/305 |
| 2007/0130915 | A1 * | 6/2007 | Beckmann | B01D 53/9495 60/285 |
| 2008/0041044 | A1 | 2/2008 | Tanaka | |
| 2009/0070014 | A1 * | 3/2009 | Miyashita | F02D 13/0261 701/105 |
| 2010/0204903 | A1 | 8/2010 | Nakatani et al. | |
| 2010/0263639 | A1 * | 10/2010 | Uhrich | F02D 41/0007 123/564 |
| 2011/0072794 | A1 * | 3/2011 | Van Nieuwstadt | F01N 3/101 60/285 |
| 2011/0072795 | A1 * | 3/2011 | Kerns | F02D 41/0007 60/285 |
| 2011/0072803 | A1 * | 3/2011 | Van Nieuwstadt | F01N 3/0231 60/287 |
| 2011/0072804 | A1 * | 3/2011 | Van Nieuwstadt | F02D 41/0055 60/287 |
| 2012/0290197 | A1 | 11/2012 | Kogo et al. | |
| 2013/0311068 | A1 * | 11/2013 | Rollinger | F02D 41/0007 701/104 |
| 2016/0032843 | A1 * | 2/2016 | Ulrey | F02D 41/0007 123/90.15 |
| 2016/0222896 | A1 * | 8/2016 | Hotta | F01N 3/0842 |
| 2016/0319757 | A1 * | 11/2016 | Nogi | F02D 41/006 |
| 2016/0326933 | A1 * | 11/2016 | Shinoda | F02D 41/0082 |
| 2017/0009644 | A1 * | 1/2017 | Rollinger | F02D 13/0261 |
| 2017/0009674 | A1 * | 1/2017 | Nogawa | F01N 3/0814 |
| 2017/0130630 | A1 * | 5/2017 | Younkins | F01N 3/0814 |

FOREIGN PATENT DOCUMENTS

| | | |
|---|---|---|
| JP | H10-47041 A | 2/1998 |
| JP | 2000-320359 A | 11/2000 |
| JP | 2002-317670 A | 10/2002 |
| JP | 2004-74138 | 3/2004 |
| JP | 2008-19871 | 1/2008 |
| JP | 4208012 | 10/2008 |
| JP | 2009-41488 | 2/2009 |
| JP | 2009-221930 A | 10/2009 |
| JP | 2011-149360 | 8/2011 |
| JP | 2011-196196 | 10/2011 |
| JP | 5418692 | 11/2013 |
| WO | WO 2006/123760 A1 | 11/2006 |

\* cited by examiner

APPARATUS AND METHOD FOR CONTROLLING AN INTERNAL COMBUSTION ENGINE

CROSS-REFERENCE TO RELATED APPLICATIONS

This application is a national phase application of International Application No. PCT/162015/002231, filed Nov. 27, 2015, and claims the priority of Japanese Application No. 2014-242035, filed Nov. 28, 2014, the content of both of which is incorporated herein by reference.

BACKGROUND OF THE INVENTION

1. Field of the Invention

The invention relates to a control device for an internal combustion engine provided with an exhaust gas control apparatus that purifies nitrogen oxides ($NO_x$) in exhaust gas and to a control method thereof.

2. Description of Related Art

An exhaust gas control apparatus that purifies $NO_x$ is known as an apparatus for controlling $NO_x$ emissions in an internal combustion engine operated on a leaner air-fuel ratio than a stoichiometric air-fuel ratio. A $NO_x$ storage-reduction catalyst and a selective catalytic reduction catalyst are known as the exhaust gas control apparatus that purifies $NO_x$. The $NO_x$ storage-reduction catalyst can store $NO_x$ in exhaust gas under a lean atmosphere with excessive oxygen and release the stored $NO_x$ when a reduction agent is supplied from the outside. Further, the $NO_x$ storage-reduction catalyst can produce reaction between the $NO_x$ and the reduction agent to reduce $NO_x$ to nitrogen ($N_2$). The selective catalytic reduction catalyst has a function for adsorbing ammonia ($NH_3$), and with this $NH_3$, the selective catalytic reduction catalyst can selectively reduce $NO_x$ in the exhaust gas.

Japanese Patent Application Publication No. 2011-149360 (JP 2011-149360 A) discloses a configuration in which the selective catalytic reduction catalyst is disposed downstream of the $NO_x$ storage-reduction catalyst. According to this configuration, $NH_3$ that had been formed during reduction of $NO_x$ by the $NO_x$ storage-reduction catalyst can be adsorbed by the selective catalytic reduction catalyst. Further, by using this $NH_3$, $NO_x$ that was not adsorbed by the $NO_x$ storage-reduction catalyst or $NO_x$ that leaked out from the $NO_x$ storage-reduction catalyst can be selectively reduced by the selective catalytic reduction catalyst.

In the case of an exhaust gas control apparatus that purifies $NO_x$ by using the selective catalytic reduction catalyst, addition of urea or the like will be necessary to make the selective catalytic reduction catalyst adsorb $NH_3$. On the other hand, in the case of an exhaust gas control apparatus that purifies $NO_x$ by using the $NO_x$ storage-reduction catalyst or by a combination of the $NO_x$ storage-reduction catalyst and the selective catalytic reduction catalyst, $NO_x$ that is generated during the lean combustion operation of the engine can be stored inside the exhaust gas control apparatus. In this case, by supplying a reduction agent from an upstream side of the exhaust flow, $NO_x$ stored inside the apparatus can be purified by reducing $NO_x$ to $N_2$. In other words, special means such as the addition of urea or the like is unnecessary. Supplying of the reduction agent to the exhaust gas control apparatus is achieved by executing a so-called rich spike control, which is processing executed to temporarily change an in-cylinder air-fuel ratio to the stoichiometric air-fuel ratio or a richer air-fuel ratio than the stoichiometric air-fuel ratio by increasing a fuel injection amount per cycle.

SUMMARY OF THE INVENTION

However, depending on an operation range of the engine, the rich spike control may not function effectively in some cases. A specific example of such an operation range is a high-torque range. In the high-torque range, a valve timing of an intake valve is advanced so as to enhance intake efficiency. In addition, a valve overlap amount between the intake valve and an exhaust valve is increased as the valve timing of the intake valve is advanced. The valve overlap in the high-torque range may cause air to flow from an intake port to an exhaust port (so-called scavenging). In particular, in a turbocharged engine, occurrence of scavenging becomes conspicuous when intake pressure is boosted by turbocharging.

When scavenging occurs, air with high oxygen concentration flows to the exhaust gas control apparatus. As a result, a reaction occurs between oxygen and the reduction agent generated by the rich spike control, and hinders the reduction of $NO_x$ by the reduction agent. Specifically, in the case of an exhaust gas control apparatus that purifies $NO_x$ by using the $NO_x$ storage-reduction catalyst, hydrocarbon (HC) and carbon monoxide (CO) necessary for the reduction of $NO_x$ are oxidized by oxygen. In the case of an exhaust gas control apparatus that purifies $NO_x$ by a combination of the $NO_x$ storage-reduction catalyst and the selective catalytic reduction catalyst, NO and CO necessary for forming $NH_3$ are oxidized by oxygen. As a result, $NO_x$ purification efficiency of the exhaust gas control apparatus is deteriorated, which may sometimes lead to discharge of $NO_x$ into the atmosphere.

The invention provides a control device for an internal combustion engine that can prevent deterioration of $NO_x$ purification efficiency by maintaining the effectiveness of the rich spike control.

First aspect of the invention relates to a control device for an internal combustion engine, the internal combustion engine including an exhaust gas control apparatus, an exhaust port, an intake port, an exhaust valve and an intake valve, the exhaust gas control apparatus configured to store $NO_x$ in exhaust gas under a leaner atmosphere with excessive oxygen compared to an atmosphere under a stoichiometric air-fuel ratio and the exhaust gas control apparatus configured react, directly or indirectly, $NO_x$ with a reduction agent supplied from an upstream side of an exhaust flow to reduce $NO_x$, the control device includes an electronic control unit configured to: (i) execute a rich spike control, the rich spike control being a control executed to temporarily change an in-cylinder air-fuel ratio from a leaner air-fuel ratio than the stoichiometric air-fuel ratio to the stoichiometric air-fuel ratio or a richer air-fuel ratio than the stoichiometric air-fuel ratio, and (ii) vary an overlap amount of the intake valve and the exhaust valve such that the overlap amount is less during execution of the rich spike control than during non-execution of the rich spike control, in an operation range where a pressure of the intake port becomes higher than a pressure of the exhaust port. A lean atmosphere with excessive oxygen refers to an atmosphere with a higher oxygen concentration than that in the exhaust gas obtained by combusting an air-fuel mixture of stoichiometric air-fuel ratio. To react a reduction agent directly with $NO_x$ means to generate a chemical reaction having the reduction agent and $NO_x$ as reactants. To react a reduction agent indirectly with $NO_x$ means to generate a chemical reaction having $NO_x$ and another product formed by a reaction between the reduction agent and another substance as the reactants.

Rich spike control is processing executed to temporarily change the in-cylinder air-fuel ratio to the stoichiometric air-fuel ratio or a richer air-fuel ratio than the stoichiometric air-fuel ratio by increasing a fuel injection amount per cycle when the internal combustion engine is operated with the in-cylinder air-fuel ratio controlled to a leaner air-fuel ratio than the stoichiometric air-fuel ratio. Rich spike control execution means is configured to execute this processing in accordance with a predetermined execution rules. Valve timing control means is configured to decrease an overlap amount of the intake valve and the exhaust valve when the rich spike control is executed in an operation range where a pressure of the intake port becomes higher than a pressure of the exhaust port, that is, in an operation range in which scavenging may occur, compared to that during non-execution of the rich spike control.

By decreasing the overlap amount between the intake valve and the exhaust valve, an air amount that flows from the intake port to the exhaust port by scavenging (hereinafter referred to as a scavenging amount) can be reduced. By reducing the scavenging amount during execution of the rich spike control, a reaction between oxygen and the reduction agents produced by the rich spike control is reduced. At the same time, direct or indirect reaction between the reduction agents and $NO_x$ can be promoted.

In the control device, the electronic control unit may be configured to maintain the overlap amount such that the overlap amount during execution of the rich spike control is the same as the overlap amount during non-execution of the rich spike control, in an operation range where the pressure of the exhaust port becomes higher than the pressure of the intake port. According to this configuration, an operation for varying the overlap amount between the intake valve and the exhaust valve is limited to the operation range where scavenging may occur. Accordingly, deterioration of combustion stability due to the variation in the overlap amount can be prevented.

In the control device, the electronic control unit may be configured to vary the overlap amount during execution of the rich spike control such that the overlap amount in the operation range where the pressure of the intake port becomes higher than the pressure of the exhaust port is larger than the overlap amount in the operation range where the pressure of the exhaust port becomes higher than the pressure of the intake port. According to this configuration, in the operation range where scavenging may occur, increasing the overlap amount can scavenge residual exhaust gas and improve charging efficiency of fresh air. Further, in the operation range where scavenging does not occur, an internal EGR amount can be reduced by decreasing the overlap amount, and a combustion limit of the lean combustion operation can be pushed up by increasing the rate of fresh-charged air in the cylinder gas.

In the control device, the electronic control unit may be configured to increase the overlap amount in accordance with advancing of a valve timing of the intake valve, and the electronic control unit may be configured to decrease the overlap amount in accordance with retarding of the valve timing of the intake valve. According to this configuration, when the rich spike control is executed in an operation range where scavenging may occur, the valve timing of the intake valve is retarded in addition to decreasing the overlap amount. Retarding the valve timing of the intake valve can decrease the charging efficiency of fresh air without lowering the pressure of the intake port by throttling the throttle valve. Thus, according to this configuration, when the rich spike control is terminated to return to the lean combustion operation again, the charging efficiency of fresh air can be readily increased.

In the control device, the exhaust gas control apparatus may include a $NO_x$ storage-reduction catalyst. The $NO_x$ storage-reduction catalyst may be configured to store $NO_x$ in the exhaust gas under the lean atmosphere with excessive oxygen. The exhaust gas control apparatus may be configured to react the reduction agents supplied from the upstream side of the exhaust flow of the $NO_x$ storage-reduction catalyst with $NO_x$ stored on the $NO_x$ storage-reduction catalyst to reduce $NO_x$ to $N_2$. According to this configuration, the reduction agents supplied from the upstream side of the exhaust flow can be directly reacted with $NO_x$ to reduce $NO_x$.

In the control device, the exhaust gas control apparatus may include a $NO_x$ storage-reduction catalyst and a selective catalytic reduction catalyst, the selective catalytic reduction catalyst may be disposed downstream of the NOx storage-reduction catalyst. According to this configuration, the exhaust gas control apparatus stores NOx in the exhaust gas in the $NO_x$ storage-reduction catalyst under the lean atmosphere with excessive oxygen, and reacts the reduction agent supplied from the upstream side of the exhaust flow with $NO_x$ stored in the $NO_x$ storage-reduction catalyst to reduce $NO_x$ to $NH_3$. Then, $NH_3$ in the exhaust gas is adsorbed by the selective catalytic reduction catalyst, and $NO_x$ released from the $NO_x$ storage-reduction catalyst is reacted with $NH_3$ adsorbed by the selective catalytic reduction catalyst to reduce $NO_x$ to $N_2$. Accordingly, the reduction agent supplied from the upstream side of the exhaust flow can be reacted indirectly with $NO_x$ to reduce $NO_x$.

Second aspect of the invention relates to a control method of an internal combustion engine. The internal combustion engine includes an exhaust gas control apparatus, an exhaust port, an intake port, an exhaust valve and an intake valve, the exhaust gas control apparatus configured to store $NO_x$ in exhaust gas under a leaner atmosphere with excessive oxygen compared to an atmosphere under a stoichiometric air-fuel ratio and the exhaust gas control apparatus configured to react, directly or indirectly, $NO_x$ with a reduction agent supplied from an upstream side of an exhaust flow to reduce $NO_x$. The control method includes: executing a rich spike control to temporarily change an in-cylinder air-fuel ratio from a leaner air-fuel ratio than the stoichiometric air-fuel ratio to the stoichiometric air-fuel ratio or a richer air-fuel ratio than the stoichiometric air-fuel ratio; and varying an overlap amount of the intake valve and the exhaust valve such that the overlap amount is less during execution of the rich spike control than during non-execution of the rich spike control, in an operation range where a pressure of the intake port becomes higher than a pressure of the exhaust port.

According to the above-mentioned control unit, the overlap amount between the intake valve and the exhaust valve is decreased during execution of the rich spike control in the operation range where the pressure of the intake port becomes higher than the pressure of the exhaust port. Accordingly, the scavenging amount during execution of the rich spike control can be reduced. As a result, a reaction between oxygen and the reduction agents produced by the rich spike control is reduced. At the same time, a direct or indirect reaction between the reduction agents and $NO_x$ can be promoted to prevent deterioration of the $NO_x$ purification efficiency.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A first embodiment will be described hereinafter with reference to the attached drawings.

Figure 1:
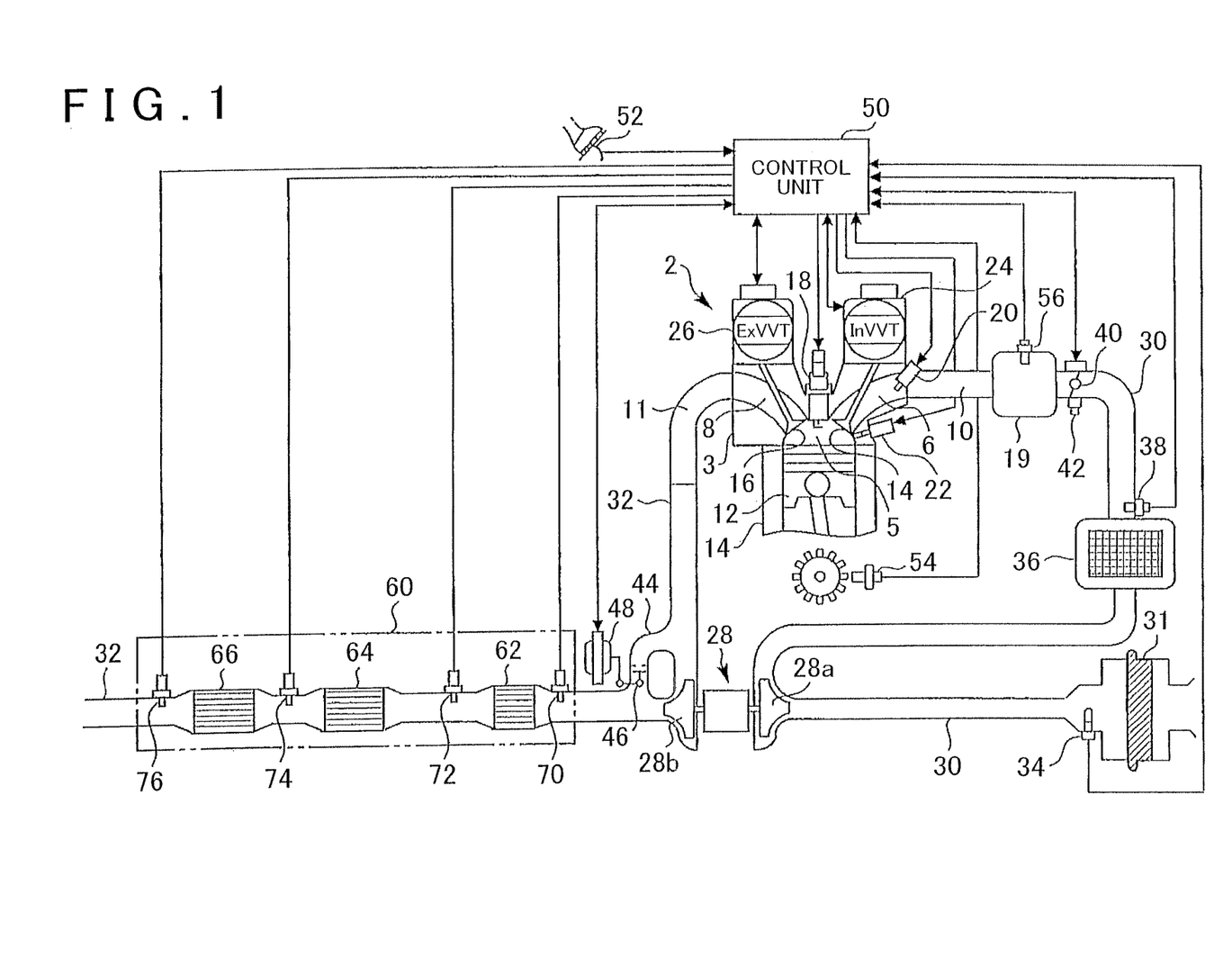
FIG. 1 is a view that illustrates a system configuration according to a first embodiment.

FIG. 1 is a view that illustrates a system configuration according to the first embodiment of the invention. The system according to this embodiment includes an internal combustion engine (hereinafter simply referred to as the engine) 2 equipped in a vehicle as a power unit. The number of cylinders the engine 2 has and how the cylinders are arranged will not be limited in particular.

The engine 2 includes a cylinder block 4 having a piston 12 arranged therein and a cylinder head 3. A space defined by the cylinder head 3 and the piston 12 forms a combustion chamber 5. The engine 2 is a spark-ignition type engine, and includes a spark plug 18 of an ignition device, which is attached to the cylinder head 3 such that the spark plug 18 protrudes from a top of the combustion chamber 5. An intake port 6 and an exhaust port 8 formed in the cylinder head 3 are open to the combustion chamber 5, respectively. A communication state of the combustion chamber 5 and the intake port 6 is controlled by an intake valve 14 provided in the cylinder head 3. A communication state of the combustion chamber 5 and the exhaust port 8 is controlled by an exhaust valve 16 provided in the cylinder head 3. An in-cylinder injection valve 22 that directly injects fuel into the combustion chamber 5 and a port injection valve 20 that injects the fuel to the intake port 6 are attached to the cylinder head 3.

In the illustrated configuration, the engine 2 is provided with an intake variable valve mechanism 24 capable of varying valve opening characteristics of the intake valve 14 and an exhaust variable valve mechanism 26 capable of varying valve opening characteristics of the exhaust valve 16. A valve mechanism, which can make at least a valve timing and an operating angle variable, is applicable to these variable valve mechanisms.

An intake manifold 10 is connected to the intake port 6. The intake manifold 10 has a surge tank 19. An intake passage 30 that takes in air from the outside is connected to the surge tank 19. An electronically controlled throttle valve 40 is provided in the intake passage 30 near the surge tank 19. An air cleaner 31 is provided at a tip end of the intake passage 30. An exhaust manifold 11 is connected to the exhaust port 8. An exhaust passage 32 that discharges the exhaust gas to the outside is connected to the exhaust manifold 11. An exhaust gas control apparatus 60, which will be explained later, is provided in the exhaust passage 32.

The engine 2 has a turbocharger 28. A compressor 28a of the turbocharger 28 is provided upstream of the throttle valve 40 in the intake passage 30. An intercooler 36 that cools intake air compressed by the compressor 28a is provided in the intake passage 30 between the compressor 28a and the throttle valve 40.

A turbine 28b of the turbocharger 28 is provided upstream of the exhaust gas control apparatus 60 in the exhaust passage 32. A bypass passage 44 that bypasses the turbine 28b is provided in the exhaust passage 32. A wastegate valve 46 is disposed in the bypass passage 44. When the wastegate valve 46 opens, a part of the exhaust gas bypasses the turbine 28b and flows through the bypass passage 44. The wastegate valve 46 is driven by an electronically controlled actuator 48.

The exhaust gas control apparatus 60 is constituted by a start catalyst (hereinafter referred to as an SC) 62, which is a three-way catalyst, a $NO_x$ storage-reduction catalyst (hereinafter referred to as an NSR) 64, and a selective catalytic reduction catalyst (hereinafter referred to as an SCR) 66. The SC 62, the NSR 64, and the SCR 66 are disposed in this order from an upstream side in the exhaust passage.

The SC 62, under a lean atmosphere, reduces $NO_x$ in the exhaust gas to $N_2$ while adsorbing oxygen, and under a rich atmosphere, oxidizes HC and CO in the exhaust gas into $H_2O$ and $CO_2$ while releasing oxygen. In this specification, a lean atmosphere refers to an atmosphere with a higher oxygen concentration than that in the exhaust gas obtained by combusting an air-fuel mixture of stoichiometric air-fuel ratio, while a rich atmosphere refers to an atmosphere with a lower oxygen concentration than that in the exhaust gas obtained by combusting the air-fuel mixture of stoichiometric air-fuel ratio. Further, when a reduction agent is supplied from an upstream side, the SC 62 produces reaction between $NO_x$ contained in the exhaust gas and the reduction agent to reduce $NO_x$ to $NH_3$ and $N_2$.

The NSR 64 stores $NO_x$ in the exhaust gas in the form of a nitrate salt such as a $Ba(NO_3)_2$ under the lean atmosphere. Further, when a reduction agent is supplied from the upstream side, the NSR 64 releases the stored $NO_x$ and produces reaction between the reduction agent and $NO_x$ to reduce $NO_x$ to $NH_3$ and $N_2$. The reduction reaction of $NO_x$ by the SC 62 and NSR 64 is expressed by the following chemical equations (1) and (2).

$$2.5H_2 + NO \rightarrow NH_3 + H_2O \quad (1)$$

$$2.5CO + NO + 1.5H_2O \rightarrow NH_3 + 2.5CO_2 + 0.5N_2 \quad (2)$$

However, when a supply amount of the reduction agent is not sufficient, $NO_x$ released by the NSR 64 is discharged to a downstream as is without being reduced.

The SCR 66 is constituted as a Fe-based zeolite catalyst. The SCR 66 adsorbs $NH_3$ formed by the SC 62 and the NSR 64, then, for example, as expressed by the following chemical equations (3) and (4), reacts $NO_x$ in the exhaust gas (mostly $NO_x$ released by the NSR 64) with the adsorbed $NH_3$ to reduce $NO_x$ to $N_2$. Since $NH_3$ is a product formed by a reaction of a reduction agent ($H_2$ and CO) with other substances (NO and $H_2O$), the reaction of $NH_3$ with $NO_x$ expressed by the following chemical equations (3) and (4) may be regarded as an indirect reaction of the reduction agent with $NO_x$.

The system of this embodiment is provided with sensors that obtain information relating to an operation state of the engine 2 at various locations. An airflow meter 34 that measures an intake air amount is disposed immediately downstream of the air cleaner 31 in the intake passage 30. A boost pressure sensor 38 that measures boost pressure is disposed immediately downstream of the intercooler 36 in the intake passage 30. A throttle position sensor 42 that measures opening of the throttle valve 40 is disposed near the throttle valve 40. An intake pressure sensor 56 that measures intake pressure is disposed in the surge tank 19.

An air-fuel ratio sensor 70 that outputs signals that linearly change relative to an air-fuel ratio of the exhaust gas before combustion is disposed immediately upstream of the SC 62 in the exhaust passage 32. In addition, an oxygen sensor 72 that outputs signals that change in a stepped manner on an oxygen-excess side and an oxygen-deficient side, based on an oxygen concentration as a threshold in the exhaust gas obtained by the combustion of the air-fuel mixture of stoichiometric air-fuel ratio, is disposed immediately downstream of the SC 62 in the exhaust passage 32. A first $NO_x$ sensor 74 that outputs signals that change in accordance with a concentration of $NO_x$ in the exhaust gas that has passed the NSR 64 is disposed immediately downstream of the NSR 64 in the exhaust passage 32. Further, a second $NO_x$ sensor 76 that outputs signals that change in accordance with the concentration of $NO_x$ in the exhaust gas that has passed the SCR 66 is disposed immediately downstream of the SCR 66 in the exhaust passage 32.

Further, the system of this embodiment includes an accelerator position sensor 52 that measures an accelerator pedal operation amount (accelerator operation amount) and a crank angle sensor 54 that measures a crank angle of the engine 2.

The various sensors and actuators described above are electrically connected to a control device 50. The control device 50 is constituted by an electronic control unit (ECU). The control device 50 is provided for controlling an overall system of the engine 2, and is constituted mainly by a computer including a CPU, a ROM, and a RAM. Various control routines including a rich spike control routine and a valve timing control routine, which will be described later, are stored in the ROM. The control device 50 controls the engine 2 by operating each of the actuators based on the signals from the respective sensors. To be specific, the control device 50 first calculates a required torque in accordance with the accelerator pedal operation amount measured by the accelerator position sensor 52. Then, an operation mode of the engine 2 is determined based on the required torque and a current engine speed calculated from signals output from the crank angle sensor 54, and the actuators are operated in accordance with the determined operation mode.

The operation modes of the engine 2 selected by the control device 50 include a stoichiometric combustion operation mode in which the engine 2 is operated while an in-cylinder air-fuel ratio is controlled to the stoichiometric air-fuel ratio and a lean combustion operation mode in which the engine 2 is operated while the in-cylinder air-fuel ratio is controlled to a leaner air-fuel ratio than the stoichiometric air-fuel ratio. The stoichiometric combustion operation mode is selected in a range from a mid- to high-speed range to a high-speed range, while the lean combustion operation mode is selected in a range from a low-speed range to a low- to mid-speed range. In an operation range in which the lean combustion operation mode is selected, and particularly in the operation range where the intake pressure becomes lower than or equal to a back pressure, the lean combustion operation is conducted by port injection from the port injection valve 20 or by a combination of port injection and in-cylinder injection, mainly relying on the port injection. In the operation range where the intake pressure becomes higher than the back pressure, the lean combustion operation is conducted by the in-cylinder injection (also called a direct injection) from the in-cylinder injection valve 22.

In the lean combustion operation mode, rich spike control is executed in accordance with a predetermined execution rules. The rich spike control is a control that temporarily changes the in-cylinder air-fuel ratio to the stoichiometric air-fuel ratio or a richer air-fuel ratio than the stoichiometric air-fuel ratio by increasing a fuel injection amount per cycle. An in-cylinder air amount used for the calculation of the fuel injection amount is calculated using an air model. In the operation range where the port injection is conducted as a main fuel injection, increasing of the fuel injection amount for the rich spike control is conducted with respect to the port injection. On the other hand, in the operation range where the in-cylinder injection is conducted as the main fuel injection, increasing of the fuel injection amount for the rich spike control is conducted with respect to the in-cylinder injection.

By setting the in-cylinder air-fuel ratio to the stoichiometric air-fuel ratio or a richer air-fuel ratio than the stoichiometric air-fuel ratio, the oxygen concentration in the exhaust gas is decreased and a large amount of reduction agents such as HC, CO, and $H_2$ are generated. When exhaust gas containing a large amount of reduction agents is supplied to the NSR 64, the atmosphere around the NSR 64 becomes a reducing atmosphere. Then, $NO_x$ that has been stored as a nitrate salt is reduced to NO and is separated from a base. Accordingly, by executing the rich spike control during the lean combustion operation allows to separate $NO_x$ stored in the NSR 64 from the NSR 64 and to restore a $NO_x$ storing performance of the NSR 64. The rich spike control is executed when the concentration of $NO_x$ measured by the $NO_x$ sensor 74 disposed immediately downstream of the NSR 64 exceeds a predetermined threshold value. Or instead, the rich spike control is executed when a storage amount of $NO_x$ estimated based on the engine speed, load, and the air-fuel ratio exceeds the predetermined threshold value.

The $NO_x$ separated from the NSR 64 by the rich spike control is reduced to $N_2$ and $NH_3$ on the NSR 64. $NH_3$ formed by the NSR 64 is captured, together with $NH_3$ formed by the SC 62, by the SCR 66 located at the most downstream position and is adsorbed on the SCR 66. A part of the $NO_x$ separated from the NSR 64 by the rich spike control is released from the NSR 64 as is without being reduced. The SCR 66 produce reaction between the adsorbed $NH_3$ and $NO_x$ released from the NSR 64 without being purified so as to reduce $NO_x$ to $N_2$. Accordingly, a case that emission is deteriorated by NOx discharged into the atmosphere can be effectively prevented.

Figure 2:
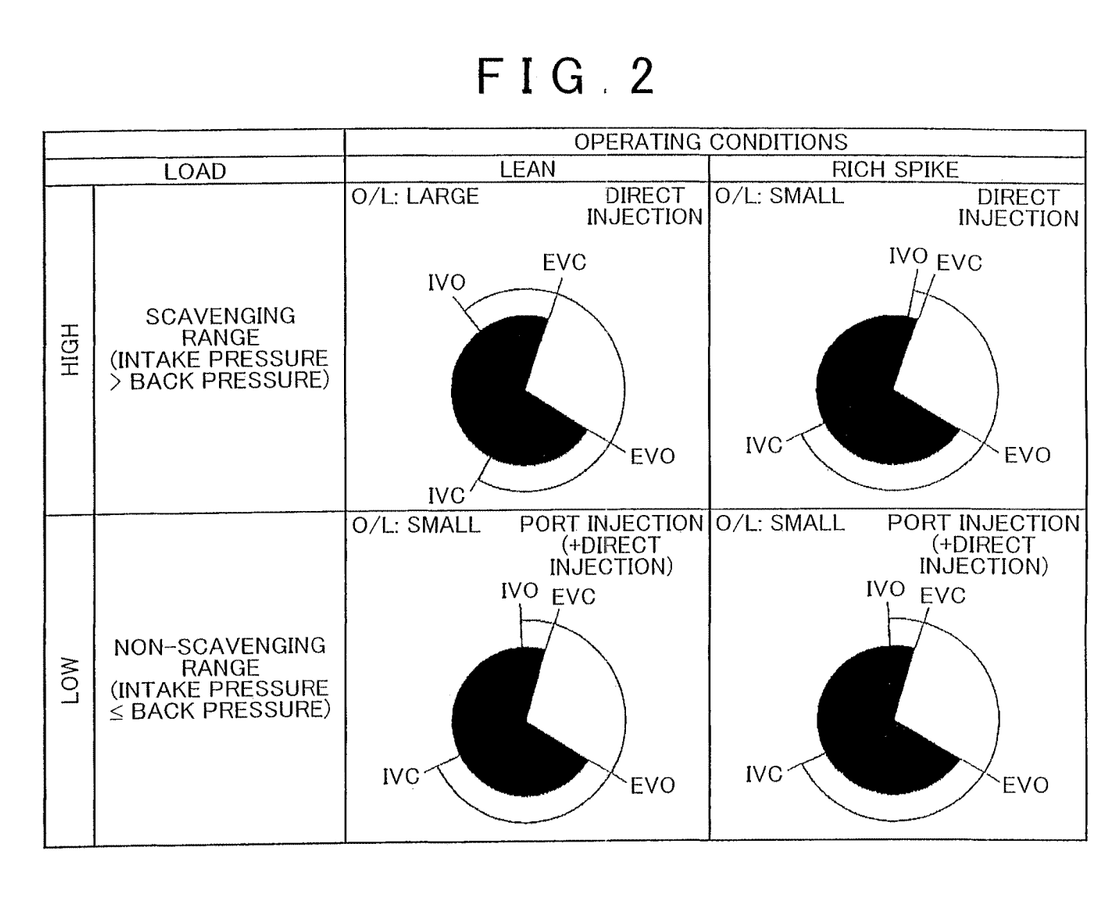
FIG. 2 is a chart that summarizes an outline of valve timing control according to the first embodiment.

FIG. 2 is a chart that summarizes an outline of a valve timing control performed in the lean combustion operation mode. In the figure, IVO indicates a timing at which the intake valve 14 opens, while IVC indicates a timing at which the intake valve 14 closes. A range between IVO and IVC indicates a range of crank angle during which the intake valve 14 is open, in other words, this range indicates an operation angle of the intake valve 14. EVO indicates a timing at which the exhaust valve 16 opens, while EVC indicates a timing at which the exhaust valve 16 closes. A range between EVO and EVC indicates a range of crank angle during which the exhaust valve 16 is open, in other words, this range indicates an operation angle of the exhaust valve 16.

Different controls are performed as the valve timing control between a non-scavenging range and a scavenging range. The non-scavenging range is the operation range in which scavenging does not occur, that is, a relatively low-load operation range with the intake pressure less than or equal to the back pressure. The intake pressure refers to the pressure of the intake port 6, and back pressure refers to the pressure of the exhaust port 8. In the non-scavenging range, the wastegate valve 46 is made full open, and mainly, the control of the air amount is performed in accordance with the opening of the throttle valve 40. In the case of a turbocharged engine like the engine 2 in this embodiment, the non-scavenging range corresponds to a non-turbocharging range where effective turbocharging by the compressor 28a is not performed. The scavenging range is the operation range in which scavenging may occur. In other words, the scavenging range is a relatively high-load operation range with an intake pressure higher than back pressure. In the scavenging range, the throttle valve 40 is made full open, and mainly, the control of the air amount is performed in accordance with the opening of the wastegate valve 46. In the case of a turbocharged engine like the engine 2 in accordance with this embodiment, the scavenging range corresponds to a turbocharging range where effective turbocharging by the compressor 28a is performed.

In the low-load range, that is, in the non-scavenging range in which scavenging does not occur, the control device 50 controls the intake variable valve mechanism 24 so as to retard IVC. Since IVO is also retarded when IVC is retarded, the crank angle from IVO to EVC, that is, an overlap amount (O/L), becomes small. By decreasing the overlap amount, an internal EGR amount can be reduced and the rate of fresh-charged air in the cylinder gas can be increased. Thus, a combustion limit of the lean combustion operation can be increased.

When executing the rich spike control in the non-scavenging range, the control device 50 does not change the valve timings of the intake valve 14 and the exhaust valve 16 before and after the rich spike control, but instead, maintains the overlap amount between the intake valve 14 and the exhaust valve 16 during non-execution of the rich spike control and during execution of the rich spike control. In other words, the control is performed such that the overlap amount during non-execution of the rich spike control and the overlap amount during execution of the rich spike control are the same. This is related to the fact that fuel injection by port injection (or a combination of port injection and in-cylinder injection, mainly relying on the port injection) is performed in the non-scavenging range including execution period of the rich spike control. By the port injection, a longer time can be taken to mix fuel and air. Accordingly, homogeneity of the air-fuel mixture can be improved. On the other hand, robustness to the fluctuation in combustion conditions is reduced compared to the in-cylinder injection. Therefore, as described above, parameters regarding the in-cylinder air amount including the valve timing and operation angle of the intake valve 14 and the overlap amount are prevented from varying both during non-execution of the rich spike control and during execution of the rich spike control. Accordingly, it becomes possible to maintain estimation accuracy of the in-cylinder air amount necessary for controlling the in-cylinder air-fuel ratio, and as a result, combustion stability in the non-scavenging range can be ensured.

In a high-load range, in other words, in the scavenging range in which scavenging may occur, the control device 50 controls the intake variable valve mechanism 24 so as to maintain the operation angle of the intake valve 14, to advance both IVC and IVO, and to bring IVC close to a BDC (a piston bottom dead center). The valve timing of the exhaust valve 16 is maintained to be the same as that in the non-scavenging range. Accordingly, the overlap amount, which is the crank angle from IVO to EVC, is increased. Increasing the overlap amount can improve scavenging efficiency of the combustion gas, while bringing IVC close to the BDC can improve charging efficiency of fresh air.

When executing the rich spike control in the scavenging range, the control device 50 decreases the operation angle of the intake valve 14 and retards both IVC and IVO. The valve timing of the exhaust valve 16 is maintained to be the same as that during-non-execution of the rich spike control. Reducing the operation angle of the intake valve 14 and retarding IVC deteriorates the charging efficiency of fresh air. As a result, it becomes possible to bring the in-cylinder air-fuel ratio into the stoichiometric ratio or enrich the in-cylinder air-fuel ratio without causing torque increase. It should be noted that at this time, the control device 50 maintains the throttle valve 40 at a fully open state, and maintains the opening of the wastegate valve 46 to be the same as that during non-execution of the rich spike control. By doing so, decrease in the pressure of intake port 6 can be prevented. Accordingly, when the rich spike control is terminated to return the lean combustion operation again, the charging efficiency of fresh air can be readily increased.

Also, by controlling the valve timing of the intake valve 14 as described above, the overlap amount, which is the crank angle from IVO to EVC is decreased compared to that during non-execution of the rich spike control. Preferably, the overlap amount is decreased such that the overlap amount becomes smaller than or equal to the overlap amount in the non-scavenging range. Thus, by decreasing the overlap amount between the intake valve 14 and the exhaust valve 16, the scavenging amount during execution of the rich spike control can be reduced.

When the rich spike control is executed, the oxygen concentration in the exhaust gas is decreased and a large amount of reduction agents such as HC, CO, and $H_2$ are generated. However, if air with high oxygen concentration flows to the exhaust port 8 by scavenging, the oxygen concentration in the entire gas that flows to the exhaust gas control apparatus 60 increases, and it becomes impossible to bring the atmosphere of the SC 62 and the NSR 64 into a reducing atmosphere. In addition, $NH_3$ formed by the SC 62 and the NSR 64 by execution of the rich spike control plays an important role in purifying $NO_x$. However, if air with high oxygen concentration flows into the exhaust gas control apparatus 60 by the scavenging, NO and CO necessary for forming $NH_3$ will be oxidized by the oxygen. As a result, formation of $NH_3$ will be prevented, greatly deteriorating the purification efficiency of $NO_x$ by the SCR 66.

According to the valve timing control of the first embodiment, an increase in the oxygen concentration of exhaust gas that flows into the exhaust gas control apparatus 60 can be prevented by reducing the scavenging amount during execution of the rich spike control. This reduces the reaction between oxygen and the reduction agents produced by the rich spike control. By promoting the formation of $NH_3$ on the SC 62 and NSR 64 expressed by the above-mentioned chemical equation (1) and chemical equation (2), the selective reduction reaction of $NO_x$ on the SCR 66 expressed by the above-mentioned chemical equations (3) and (4) can be promoted. Accordingly, effectiveness of the rich spike control can be maintained, and deterioration of $NO_x$ purification efficiency caused by the scavenging can be prevented.

Figure 3:
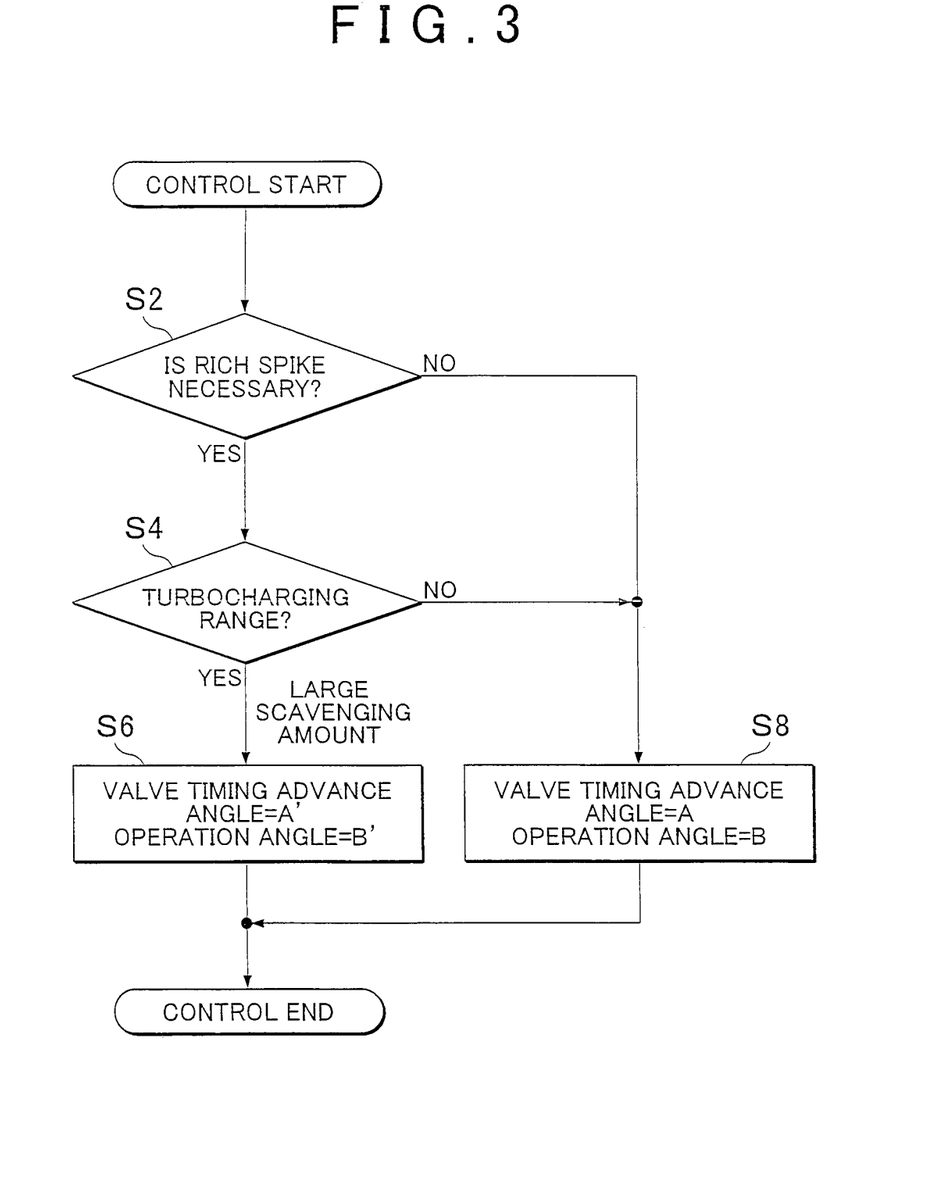
FIG. 3 is a flowchart that illustrates a flow of the valve timing control according to the first embodiment.

FIG. 3 is a flowchart that illustrates a flow of the valve timing control performed by the control device 50 in the lean combustion operation mode. When the operation mode of the engine 2 is in the lean combustion operation mode, the control device 50 performs the valve timing control in accordance with the flow shown in FIG. 3. The flow shown in FIG. 3 is constituted by four steps from step S2 to step S8.

In step S2, the control device 50 determines whether the rich spike control is necessary, in other words, whether rich spike control execution conditions have been satisfied. For example, as described above, the rich spike control execution conditions include that the $NO_x$ concentration downstream of the NSR 64 which is measured by the $NO_x$ sensor 74 has exceeded a threshold value, that the $NO_x$ storage amount of the NSR 64 estimated and computed based on the engine speed and load and air-fuel ratio has exceeded a threshold value, or the like.

If the result of determination in step S2 is No, that is, when the rich spike control is not executed, the control device 50 performs the processing in step S8. In step S10, the control device 50 sets an advance angle of the valve timing of the intake valve 14 to a value A corresponding to the load of the engine 2 and sets the operation angle of the intake valve 14 to a value B corresponding to the load.

If the result of determination in step S2 is Yes, that is, when the rich spike control is executed, the control device 50 next performs the determination in step S4. In step 4, the control device 50 determines whether the operation range of the engine 2 is in the turbocharging range, in other words, whether the operation range is in a scavenging range where scavenging may occur. Whether the operation range is in the turbocharging range (the scavenging range) or in the non-turbocharging range (the non-scavenging range) can be determined based on a relationship between the current speed and current load of the engine 2. Instead, determination can also be made based on whether the boost pressure measured by the output of the boost pressure sensor 38 is higher than the atmospheric pressure.

If the result of determination in step S4 is No, that is, if the operation range of the engine 2 is in the non-turbocharging range, the control device 50 performs the processing in step S8. In step S8, the control device 50 sets the advance angle of the valve timing of the intake valve 14 to the value A corresponding to the load of the engine 2 and sets the operation angle of the intake valve 14 to the value B corresponding to the load.

If the result of determination in step S4 is Yes, that is, if the operation range of the engine 2 is in the turbocharging range, the control device 50 performs the processing in step S6. In step S6, the control device 50 sets the advance angle of the valve tuning of the intake valve 14 to a value A' corresponding to the load of the engine 2 and sets the operation angle of the intake valve 14 to a value B' corresponding to the load. However, the value A' of the advance angle of the valve timing of the intake valve 14 is, when compared under the same load, a value smaller than the value A of the advance angle set in step S8. The value B' of the operation angle of the intake valve 14 is, when compared under the same load, a value smaller than the value B of the operation angle set in step S8. Accordingly, the overlap amount of the intake valve 14 and the exhaust valve 16 is decreased and the scavenging amount is controlled. Further, the charging efficiency of fresh air can be decreased without lowering the intake pressure by throttling the throttle valve 40

Figure 4:
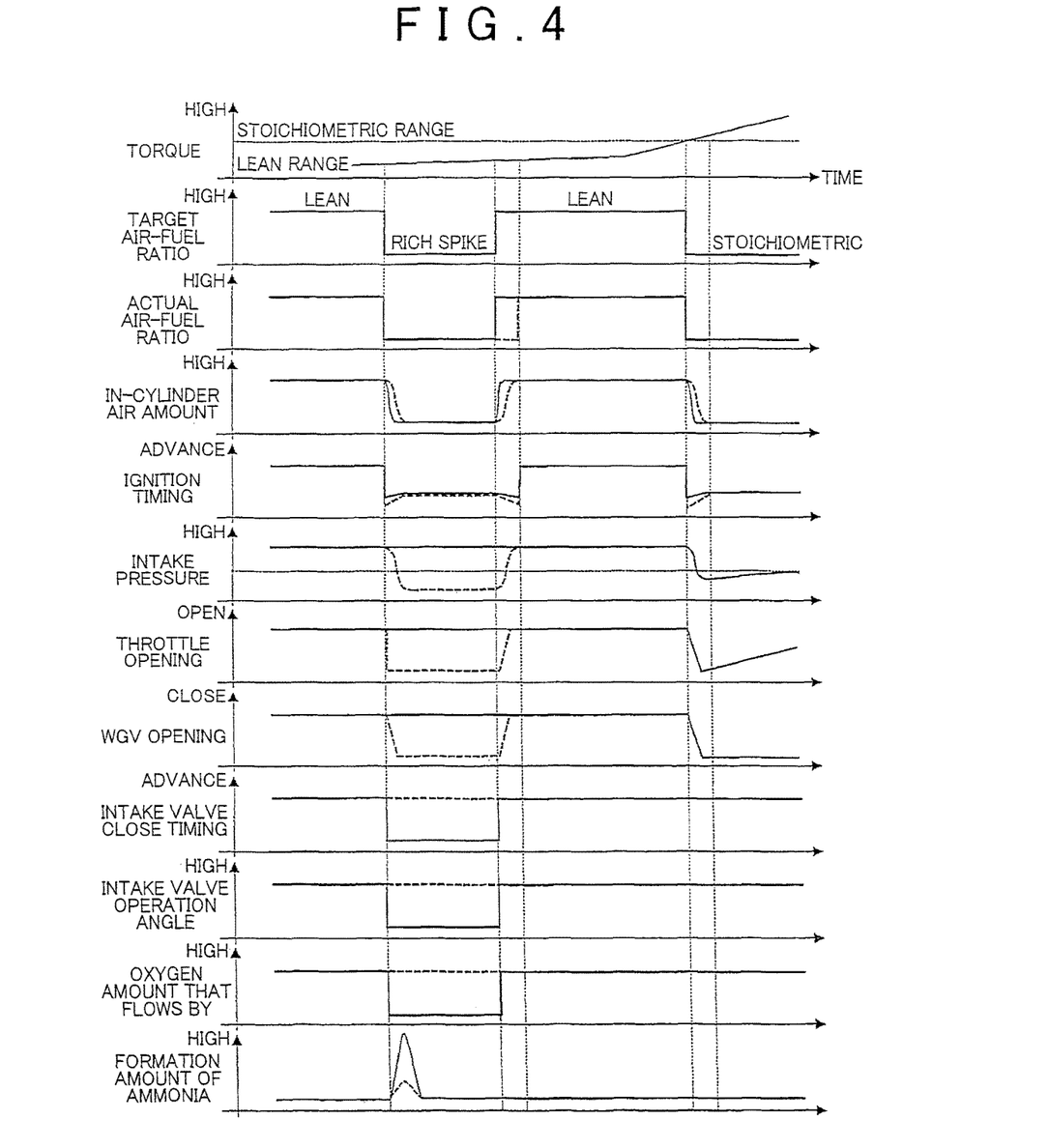
FIG. 4 is a timing chart that explains the valve timing control and effects thereof in a scavenging range according to the first embodiment.

FIG. 4 is a timing chart that explains the valve timing control and effects thereof in the scavenging range which is performed by the control device 50. The timing chart in FIG. 4 shows, from the top, the torque, a target air-fuel ratio, an actual air-fuel ratio, the in-cylinder air amount, ignition timing, the intake pressure, opening of the throttle valve 40, opening of the wastegate valve 46 (WGV opening), close timing of the intake valve 14, operation angle of the intake valve 14, an oxygen amount passed through during scavenging, and a formation amount of ammonia at the SC 62 and the NSR 64, all expressed in terms of change over time. In the chart, solid lines show results of the valve timing control according to this embodiment, and dotted lines show results of the valve timing control according to a comparative example.

In the comparative example, when the rich spike control is performed in the scavenging range (high-load range), the close timing and the operation angle of the intake valve 14 are maintained to be the same as those during non-execution of the rich spike control. Although the close timing and the operation angle of the intake valve 14 are also maintained to be the same as those during non-execution of the rich spike control and during execution of the rich spike control in the non-scavenging range of this embodiment, the comparative example also applies this control to the valve timing control in the scavenging range.

According to the valve timing control of the comparative example, as a result of the close timing of the intake valve 14 being maintained to be the same as that during nonexecution of the rich spike control, the overlap amount between the intake valve 14 and the exhaust valve 16 is also maintained as is. Accordingly, the same amount of oxygen as that during non-execution of the rich spike control blows from the intake port 6 to the exhaust port 8 also during execution of the rich spike control. As a result, the reduction agents produced by the rich spike control end up reacting with the oxygen, and therefore hinder the formation of $NH_3$ by the SC 62 and the NSR 64.

On the other hand, according to the valve timing control of this embodiment, when the rich spike control is executed, the close timing of the intake valve 14 is retarded and the operation angle of the intake valve 14 is made smaller. Accordingly, the overlap amount between the intake valve 14 and the exhaust valve 16 is decreased, and the oxygen amount that blows from the intake port 6 to the exhaust port 8 by the scavenging is decreased. As a result, the reaction between oxygen and the reduction agent produced by the rich spike control is reduced, while the formation of $NH_3$ by the SC 62 and the NSR 64 is promoted. Accordingly, deterioration of $NO_x$ purification efficiency caused by the scavenging can be prevented.

Further, according to the valve timing control of the comparative example, the close timing and operation angle of the intake valve 14 are maintained to be the same as those during non-execution of the rich spike control. Therefore, in order to decrease the in-cylinder air amount (an amount of fresh air sucked into the cylinder), the throttle valve 40 needs to be closed and the wastegate valve 46 needs to be opened. However, due to a delay in response of the intake pressure to the operation of the throttle valve 40 and the wastegate valve 46, the in-cylinder air amount decreases with a time lag from enriching of the actual air-fuel ratio. Accordingly, to prevent the torque from becoming excessive, the ignition timing needs to be largely retarded until the in-cylinder air amount decreases to the target. In this case, retardation of the ignition timing may lead to deterioration of fuel efficiency.

In addition, according to the valve timing control of the comparative example, when returning to the lean combustion operation from the rich spike control, a time lag is generated in increasing of the in-cylinder air amount. This is because, even when the throttle valve 40 is promptly opened and the wastegate valve 46 is promptly closed, the intake pressure does not immediately rise once the intake pressure lowers. If the air-fuel ratio is caused to be on the lean side despite the fact that the in-cylinder air amount has not increased, the torque will rapidly drop. Consequently, in the case of the comparative example, the actual air-fuel ratio cannot be made lean to the target air-fuel ratio, and enriching of the actual air-fuel ratio needs to be continued until the in-cylinder air amount increases to the target. In addition, to prevent the torque from becoming excessive due to continuation of enriching the actual air-fuel ratio, the ignition timing also needs to be retarded until the in-cylinder air amount increases to the target. The longer enriching duration of the actual air-fuel ratio and the longer duration of ignition timing retardation lead to deterioration of fuel efficiency.

On the other hand, according to the valve timing control of this embodiment, the in-cylinder air amount is decreased by retarding the close timing of the intake valve 14. Since the in-cylinder air amount is highly responsive to the change of close timing of the intake valve 14, the in-cylinder air amount can be decreased without much delay from enriching of the actual air-fuel ratio. Accordingly, the ignition timing can be retarded by a small amount to prevent excessive torque, preventing deterioration of fuel efficiency thereby.

Further, according to the valve timing control of this embodiment, since the opening of the throttle valve 40 and the opening of the wastegate valve 46 are maintained, a decrease in the intake pressure due to execution of the rich spike control can be prevented. As long as the intake pressure is maintained, the in-cylinder air amount can be promptly increased by advancing the close timing of the intake valve 14. As a result, it becomes possible to make the actual air-fuel ratio lean in accordance with the target air-fuel ratio, and therefore continuation of enriching of the actual air-fuel ratio will no longer be necessary. Thus, deterioration of fuel efficiency can be prevented.

Next, a second embodiment of the invention will be described with reference to the drawing.

Figure 5:
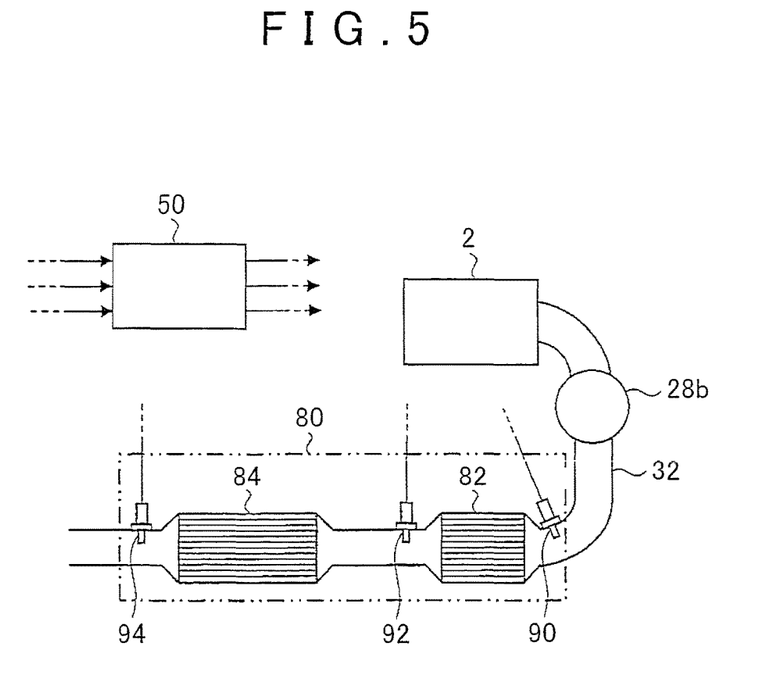
FIG. 5 is a view that illustrates a system configuration according to a second embodiment.

FIG. 5 is a view that illustrates a system configuration according to the second embodiment of the invention. The system according to this embodiment includes the engine 2 and the control device 50 that controls the engine 2. Since the configuration of the engine 2 and functions of the control device 50 are common to those of the first embodiment, detailed description thereof will be omitted herein. The difference between the system of this embodiment and the system of the first embodiment is the configuration of an exhaust gas control apparatus 80 provided in the exhaust passage 32.

The exhaust gas control apparatus 80 is constituted by an SC 82 and an NSR 84. The SC 82 is disposed in the exhaust passage on an upstream side thereof, and the NSR 84 is disposed in the exhaust passage on a downstream side thereof. An air-fuel ratio sensor 90 is disposed immediately upstream of the SC 82 in the exhaust passage 32, and an oxygen sensor 92 is disposed immediately downstream of the SC 82 in the exhaust passage 32. A $NO_x$ sensor 94 is disposed immediately downstream of the NSR 84 in the exhaust passage 32.

The characteristics of the SC 82 are common to those of the SC 62 described for the first embodiment. The SC 82, under a lean atmosphere, reduces $NO_x$ in the exhaust gas to $N_2$ while adsorbing oxygen, and under a rich atmosphere, oxidizes HC and CO in the exhaust gas to $H_2O$ and $CO_2$ while releasing oxygen.

The NSR 84 has a larger $NO_x$ storage capacity than the NSR 64 of the first embodiment (for example, twice as much storage capacity as the NSR used in combination with SCR). The NSR 84 stores $NO_x$ in the exhaust gas in the form of a nitrate salt such as a $Ba(NO_3)_2$ under the lean atmosphere. Further, when a reduction agent is supplied from the upstream side of the exhaust flow, the NSR 84 releases the stored $NO_x$ and reacts, for example, the reduction agent with $NO_x$ to reduce $NO_x$, as expressed by chemical equations (5) and (6). In the NSR 84, $NO_x$ is reduced to $N_2$ by a direct reaction with $NO_x$.

$$CO + NO \rightarrow CO_2 + 0.5N_2 \qquad (5)$$

$$CH_y + (2+y/2)NO \rightarrow CO_2 + (y/2)H_2O + \tfrac{1}{2}(2+y/2)N_2 \qquad (6)$$

The control device 50 executes the rich spike control in the lean combustion operation mode, in a similar manner to that in the first embodiment. By executing the rich spike control during the lean combustion operation, $NO_x$ stored in the NSR 84 is separated therefrom, such that the $NO_x$ storing performance of the NSR 84 is recovered. The rich spike control is executed in accordance with a predetermined execution rules. For example, the rich spike control is executed when the concentration of $NO_x$ measured by the $NO_x$ sensor 94 disposed immediately downstream of the NSR 84 exceeds a predetermined threshold value. $NO_x$ that has separated from the NSR 84 by the rich spike control is reduced to $N_2$ on the NSR 84.

However, when the engine 2 is operated in the scavenging range, HC and CO necessary for the reduction of $NO_x$ will be oxidized by oxygen if air containing a high concentration of oxygen flows into the exhaust gas control apparatus 80 by the scavenging while executing the rich spike control. As a result, the reduction of $NO_x$ is hindered, and the purification efficiency of $NO_x$ on the NSR 84 is significantly deteriorated.

In the valve timing control of this embodiment, similarly to the first embodiment, when the rich spike control is executed, the close timing of the intake valve is retarded and the operation angle of the intake valve is made smaller. Accordingly, the overlap amount between the intake valve and the exhaust valve is decreased, and the oxygen amount that blows from the intake port to the exhaust port by the scavenging is decreased. As a result, the reaction between oxygen and the reduction agent produced by the rich spike control can be reduced, while reduction reaction of $NO_x$ by the NSR 84 as expressed by the above-mentioned chemical equations (5) and (6) can be promoted. In other words, even in the case where the exhaust gas control apparatus 80 is configured as described above, effectiveness of the rich spike control can be maintained by performing the valve timing control similar to that in the first embodiment.

Accordingly, deterioration of $NO_x$ purification efficiency caused by the scavenging can be prevented.

Other Embodiments

The invention is not limited to the above-described embodiments, and may be implemented in various forms within a scope not departing from the gist of the invention. For example, the SC (three-way catalyst) provided in the exhaust gas control apparatus in the systems of the first and the second embodiments is not an indispensable component for carrying out the invention. The exhaust gas control apparatus may only include the NSR, or the exhaust gas control apparatus may only include the NSR and the SCR. While the overlap amount is varied by controlling the valve timing of the intake valve in the systems of the first and the second embodiments, the overlap amount may also be varied by controlling the valve timing of the exhaust valve in addition to the intake valve.

The invention claimed is:

1. A control device for an internal combustion engine, the internal combustion engine including an exhaust gas control apparatus, an exhaust port, an intake port, an exhaust valve and an intake valve, the exhaust gas control apparatus configured to store $NO_x$ in exhaust gas under a leaner atmosphere with excessive oxygen compared to an atmosphere under a stoichiometric air-fuel ratio and the exhaust gas control apparatus configured to react, directly or indirectly, $NO_x$ with a reduction agent supplied from an upstream side of an exhaust flow to reduce $NO_x$, the control device comprising:
an electronic control unit configured to:
(i) execute a rich spike control, the rich spike control being a control executed to temporarily change an in-cylinder air-fuel ratio from a leaner air-fuel ratio than the stoichiometric air-fuel ratio to the stoichiometric air-fuel ratio or a richer air-fuel ratio than the stoichiometric air-fuel ratio;
(ii) vary an overlap amount of the intake valve and the exhaust valve such that the overlap amount is less during execution of the rich spike control than during non-execution of the rich spike control, in an operation range where a pressure of the intake port becomes higher than a pressure of the exhaust port; and
(iii) decrease the overlap amount of the intake valve and the exhaust valve when the rich spike control is executed in the operation range where the pressure of the intake port becomes higher than the pressure of the exhaust port, wherein the overlap amount of the intake valve and the exhaust valve when the rich spike control is executed in the operation range where the pressure of the intake port is higher than the pressure of the exhaust port is less than or equal to the overlap amount of the intake valve and the exhaust valve when the rich spike control is executed in an operation range where the pressure of the intake port becomes less than or equal to the pressure of the exhaust port.

2. The control device according to claim 1, wherein the electronic control unit is configured to maintain the overlap amount such that the overlap amount during execution of the rich spike control is the same as the overlap amount during non-execution of the rich spike control, in an operation range where the pressure of the exhaust port becomes higher than the pressure of the intake port.

3. The control device according to claim 1, wherein the electronic control unit is configured to vary the overlap amount during non-execution of the rich spike control such that the overlap amount in the operation range where the pressure of the intake port becomes higher than the pressure of the exhaust port is larger than the overlap amount in the operation range where the pressure of the exhaust port becomes higher than the pressure of the intake port.

4. The control device according to claim 1, wherein
the electronic control unit is configured to increase the overlap amount in accordance with advancing of a valve timing of the intake valve, and
the electronic control unit is configured to decrease the overlap amount in accordance with retarding of the valve timing of the intake valve.

5. The control device according to claim 1, wherein
the exhaust gas control apparatus includes a $NO_x$ storage-reduction catalyst, and the $NO_x$ storage-reduction catalyst is configured to store $NO_x$ in the exhaust gas under the lean atmosphere with excessive oxygen, and
the exhaust gas control apparatus is configured to react the reduction agents supplied from the upstream side of the exhaust flow of the $NO_x$ storage-reduction catalyst with $NO_x$ stored on the $NO_x$ storage-reduction catalyst to reduce $NO_x$ to $N_2$.

6. The control device according to claim 1, wherein the exhaust gas control apparatus includes a $NO_x$ storage-reduction catalyst and a selective catalytic reduction catalyst, the selective catalytic reduction catalyst is disposed downstream of the $NO_x$ storage-reduction catalyst.

7. A control method of an internal combustion engine, the internal combustion engine including an exhaust gas control apparatus, an exhaust port, an intake port, an exhaust valve and an intake valve, the exhaust gas control apparatus configured to store $NO_x$ in exhaust gas under a leaner atmosphere with excessive oxygen compared to an atmosphere under a stoichiometric air-fuel ratio and the exhaust gas control apparatus configured to react, directly or indirectly, $NO_x$ with a reduction agent supplied from an upstream side of an exhaust flow to reduce $NO_x$, the control method comprising:
executing a rich spike control to temporarily change an in-cylinder air-fuel ratio from a leaner air-fuel ratio than the stoichiometric air-fuel ratio to the stoichiometric air-fuel ratio or a richer air-fuel ratio than the stoichiometric air-fuel ratio;
varying an overlap amount of the intake valve and the exhaust valve such that the overlap amount is less during execution of the rich spike control than during non-execution of the rich spike control, in an operation range where a pressure of the intake port becomes higher than a pressure of the exhaust port; and
decreasing the overlap amount of the intake valve and the exhaust valve when the rich spike control is executed in the operation range where the pressure of the intake port becomes higher than the pressure of the exhaust port, wherein the overlap amount of the intake valve and the exhaust valve when the rich spike control is executed in the operation range where the pressure of the intake port is higher than the pressure of the exhaust port is less than or equal to the overlap amount of the intake valve and the exhaust valve when the rich spike control is executed in an operation range where the pressure of the intake port becomes less than or equal to the pressure of the exhaust port.

* * * * *